United States Patent [19]

Carstensen

[11] Patent Number: 4,706,997
[45] Date of Patent: Nov. 17, 1987

[54] COUPLING FOR TUBING OR CASING AND METHOD OF ASSEMBLY
[76] Inventor: Kenneth J. Carstensen, 4540 No. 44th St., No. 70, Phoenix, Ariz. 85018
[21] Appl. No.: 802,943
[22] Filed: Nov. 27, 1985

Related U.S. Application Data

[63] Continuation of Ser. No. 379,615, May 19, 1982, abandoned.
[51] Int. Cl.$^4$ .............................................. F16L 15/00
[52] U.S. Cl. ......................................... 285/13; 285/55; 285/332.2; 285/333; 285/383
[58] Field of Search ................... 285/369, 332.2, 332.3, 285/333, 334, 383, 355, DIG. 25, 13, 924, 55

[56] References Cited

U.S. PATENT DOCUMENTS

| | | |
|---|---|---|
| 262,581 | 8/1882 | Doolittle . |
| 581,050 | 4/1897 | Wentz .............................. 285/369 X |
| 1,590,357 | 6/1926 | Feisthamel ...................... 285/333 X |
| 1,889,868 | 12/1932 | Montgomery .................. 285/383 X |
| 1,889,869 | 12/1932 | Montgomery .................. 285/383 X |
| 1,889,870 | 12/1932 | Montgomery . |
| 2,122,757 | 7/1938 | Scott . |
| 2,150,221 | 3/1939 | Hinderliter ...................... 285/332.3 |
| 2,181,345 | 11/1939 | Reimschissel . |
| 2,187,217 | 1/1940 | Winslow . |
| 2,320,107 | 5/1943 | Speckert ......................... 285/333 X |
| 2,380,690 | 7/1945 | Graham . |
| 2,487,241 | 11/1949 | Hilton .............................. 285/369 X |
| 2,907,589 | 10/1959 | Knox . |
| 2,980,451 | 4/1961 | Taylor et al. . |
| 2,992,019 | 7/1961 | MacArthur . |
| 3,047,316 | 7/1962 | Wehring et al. . |
| 3,054,628 | 9/1962 | Hardy et al. . |
| 3,089,713 | 5/1963 | Scaramucci ............ 285/DIG. 25 X |
| 3,100,656 | 8/1963 | MacArthur .................... 285/332.2 X |
| 3,253,841 | 5/1966 | Ahmad . |
| 3,266,821 | 8/1966 | Safford ............................ 285/383 X |
| 3,339,945 | 9/1967 | McCrory, Jr. et al. ........ 285/355 X |
| 3,403,931 | 10/1968 | Crain et al. . |
| 3,467,413 | 9/1969 | Madrelle ......................... 285/334 X |
| 3,472,533 | 10/1969 | Turner . |
| 3,489,437 | 1/1970 | Duret . |
| 3,572,777 | 3/1971 | Blose ................................. 285/334 |
| 3,620,555 | 11/1971 | Hinds et al. . |
| 3,811,710 | 5/1974 | Dula et al. ...................... 285/369 X |
| 3,831,259 | 8/1974 | Goulas . |
| 3,850,461 | 11/1974 | Fujioka et al. . |
| 3,923,324 | 12/1975 | Cruickshank et al. . |
| 4,009,893 | 3/1977 | Schatton et al. . |
| 4,154,466 | 5/1979 | Simmons . |
| 4,209,193 | 6/1980 | Ahlstone . |
| 4,253,687 | 3/1981 | Maples . |

FOREIGN PATENT DOCUMENTS

| | | | |
|---|---|---|---|
| 18096 | 6/1970 | Japan ................................ 285/334 |
| 31220 | 3/1978 | Japan ................................ 285/355 |
| 402748 | 5/1966 | Switzerland ..................... 285/369 |
| 1115AD | of 1892 | United Kingdom ............ 285/369 |
| 392827 | 5/1933 | United Kingdom ............ 285/333 |
| 1160282 | 8/1969 | United Kingdom . |
| 1223170 | 2/1971 | United Kingdom ............ 285/333 |

Primary Examiner—Thomas F. Callaghan
Attorney, Agent, or Firm—Bogucki, Scherlacher, Mok & Roth

[57] ABSTRACT

Precision makeup at high speed of the most used forms of pipe and casing for production wells is assured by a novel coupling system. A pipe collar is provided with an internal precision makeup ring whose length along the pipe axis assures precise positioning and engagement. When the nose of the pipe is engaged with metal-to-metal contact against a reference shoulder on the precision ring a side surface on the nose end of the pipe engages a center seal ring disposed in the side wall of the collar between the reference shoulder and the threaded portion. This seal constitutes an effective barrier against the leakage of high internal pressures into the thread engagement region. End seals are mounted in grooves in the end recess portions of the collar, outside the threaded engagement region, to provide seals against external pressure, which can also vent internal pressures that are in excess of a predetermined threshold. With this arrangement, a modified standard collar or a manufactured collar can be placed on a pipe or casing off the drill rig floor, with the axial length of the precision ring being selected to assure makeup tightness adjusted to particular axial stress conditions. Makeup on the rig floor requires only stabbing of the next pipe section into the collar and engagement until metal-to-metal contact is achieved and seals are concurrently established. Pipes and collars can readily be prescreened to eliminate a minor proportion of elements whose thread tapers vary more than is permissible for the given conditions.

22 Claims, 17 Drawing Figures

FIG. II

COUPLING FOR TUBING OR CASING AND METHOD OF ASSEMBLY

This is a continuation of co-pending application Ser. No. 379,615 filed on May 19, 1982 and now abandoned.

BACKGROUND OF THE INVENTION

Oil well pipe and casing are examples of tubular products used in production wells that are subjected to particularly stringent operating conditions. They must, for example, withstand extremely high mechanical loads when connected together in a long string, and at the same time be substantially unaffected by both internal and external pressures and corrosive environments. The extremely high pressures encountered, for example, can cause differential deformation of the threaded pin end of a pipe relative to the receiving collar if the pressurized gases or liquids penetrate between the threaded regions, sometimes causing decoupling of the string. One obvious response by those in the art to these conditions has been to employ special coupling arrangements, based on high strength sections and square or rectangular threads, such as shown in U.S. Pat. Nos. 4,009,893, 4,154,466, 4,209,193 and 4,253,687.

The practical state of the art is shown in a book widely used in the oil industry entitled "Tubular Connection Data", published by Weatherford/Lamb, a Weatherford International Company, 2nd edition, copyright 1978. This book depicts the great majority of couplings that are currently in field use today, including standardized American Petroleum Institute (A.P.I.) "8 round" and "buttress" tubing, and a number of specialized couplings using internal seals in the threaded region, corrosion barriers and the like.

While the special box (collar) and pin (pipe or casing) couplings are of theoretical benefit, they are of far less practical utility because they are nonstandard and expensive. There is today a vast inventory of A.P.I. pipe of 8 round and buttress type in different grades and weights which must be kept in use for obvious economic reasons. Equally obviously, the procedures used at the pipe rack and on the rig floor should involve a minimum number of conventional steps, and be quick, convenient and inexpensive to implement. It is particularly desirable to expand the range of field conditions under which A.P.I. pipe can be used while reducing the number of circumstances under which special equipment or instrumentation is needed. For more critical situations, equipment can be employed which counts turns, monitors torque or measures bearing pressures during makeup. Measurement of torque is not an accurate guide to engagement, because friction factors, thread profile and pitch, thread smoothness and lubricity all have an effect on the reading. When makeup is complete, instrumentation systems can be used to test the integrity of the seal with gas or liquid. Using both categories of equipment together is extremely costly but even where used does not permit expansion of the role of A.P.I. tubing. In a joint that is very tightly made, the entering end of the pin is highly stressed, approaching the yield point at this thinnest portion of the tapered thread. A slight inattention on the part of an operator results in overstressing or galling of the pipe. Even with proper makeup galling or permanent deformation occurs in the forward threads on the pin after a few engagement operations. Consequently there is an inherent limit to the usage of increased bearing pressure to assure a pressure seal. Even more, reliance on a tight thread engagement for sealing is essentially unreliable because of tolerances that must be accepted, thread damage and other non-uniformities. Recognition of these factors has led to the widespread usage of field instrumentation mentioned above.

The practical operating and cost requirements focus attention on crucial specific problems involved in making up secure leak-free joints under field conditions. A.P.I. pipe has a specified length and taper angle of thread on the box and pin, and includes defined acceptable tolerances for the tapers. The collar or box has inner diameter threads which taper inwardly from each end to a threaded mid-region or crest of smallest inner diameter, such that the pin can be threaded in to a penetration depth which is limited only by the forces which can be exerted during makeup. With A.P.I. pipe, assuring proper coupling of the pin to the box on the rig floor presents significant problems. The "last scratch mark" of the threaded region defines a reference against which the nominal depth of insertion can be gauged, but it is not practical to monitor last scratch position in the fast paced and environmentally imperfect conditions under which extremely long strings of production tubing and casing must be assembled. Moreover, many imperfections and defects relate to sealing problems and prevent use of pipe for this reason only even though mechanical engagement may be adequate. Under present practice such pipe can be used in only very limited ways or must be scrapped.

Details as to standard A.P.I. pipe can be found in A.P.I. Standard 5B (10th edition), March 1979 and Supplement 1 thereto issued March 1980, these documents being issued by the American Petroleum Institute, Production Department, 211 North Ervay, Suite 1700, Dallas, Tex. 75201. The standards define such factors as the angles of taper, pitch, profile, and effective thread length, as well as the plane of hand tight engagement and the plane of "vanish point" which defines a theoretical position for a power-tight makeup. The term "taper" is usually regarded as involving both the angle and the dimension of the pipe thread, which together determine the depth of penetration of the pin end into an ideal collar. In these standards, it should be noted that with round thread or buttress thread a space is necessary between mating thread profiles. In the round thread, for example, this is referred to as a "root helix", and this small clearance provides a continuous path through which leakage or buildup of a high pressure fluid can occur.

If the pin taper is at the opposite end of the tolerance limit from the box thread taper, or if the dimensional variations are at opposite tolerance limits, then adequate thread engagement may occur either well before or well after the nominal position defined by reference to the last scratch mark. The assumption that adequately firm thread engagement will provide the needed internal and external seal is not a satisfactory basis for makeup because of the problems of thread damage and pressure buildup within the root helix at the extremely high pressures that are encountered.

It should be noted, as evidenced by U.S. Pat. Nos. 2,980,451, 3,047,316, 3,054,628, 3,831,259 and 3,923,324, as well as some of the earlier referenced patents, that it has been common for a long time to utilize seal elements positioned within the threaded region of a pin and box junction.

Such seals are generally referred to in the industry as Atlas-Bradford seals, and their benefits must be weighed against their disadvantages. They are incorporated in a portion of the threaded structure, which means in turn that they reduce both the length of thread engagement and the wall diameter. Furthermore, they introduce internal stress risers in a critical portion of the thread engagement zone. In addition, the threads of an entering pin deform or tap through the seal, and it is found in practice that an imperfection or irregularity can cause the seal to become caught and either disengaged or destroyed during makeup. Such seals are also disposed against the external end of the threaded region and equally provide a barrier to the release of internal pressure. This in turn means that an internal pressure can penetrate between the opposed pin and box threads throughout most of their lengths, and can cause the differential deformation that might lead to decoupling of the string.

Other coupling designs are based on the usage of metal-to-metal seals at one or both ends of the threaded region. Since metal-to-metal seals require an almost perfect mirror finish, contact between metal surfaces does not always provide a reliable seal, particularly under field conditions, because of galling, scratches, or other damage that might occur to one or the other of the surfaces. Furthermore, when surfaces must be precisely placed with the degree of accuracy required for these seals, the product cost is increased by multiple, rather than fractional, amounts. Under actual operating conditions, penetration of a corrosive high pressure fluid into the threaded engagement region over a substantial period of time may not only have catastrophic effects, but may create time consuming problems because of corrosion of the threads, drying out of the pipe joint compound or lubricant, and weakening of the coupling. External pressures can also act adversely on the coupling system. Leakage in a casing may, for example, surround an encompassed tubing with a high pressure, low flow environment that is of substantially higher pressure than the interior of the tubing. Such pressures can build up within the threaded portion of the coupling and have the previously mentioned adverse effects.

Despite all of the efforts which have been exerted toward improvement of designs and rig floor assemblies, there still remains a need for improved couplings that can be used with existing inventories of A.P.I. pipe. Furthermore, such improved couplings should facilitate reliable and uniform pipe makeup on the rig floor and require no more time than is presently used for standard pipe makeup. There is also need for precise sealing and mechanical engagement in other contexts as well, such as pipe lines using A.P.I. couplings. In some long pipe lines threaded couplings are used because corrosive fluids require plastic coatings that would be damaged by welding temperatures. Extremely high stresses may be introduced along the pipe axis by thermal expansion and contraction, but at the same time the pressure seal must be maintained.

SUMMARY OF THE INVENTION

Threaded couplings in accordance with the invention incorporate a pair of oppositely facing, precisely separated, reference shoulders defined by a centrally disposed precision metal makeup ring interior to a pipe collar meeting A.P.I. standards. When pipe is threaded into engagement with the makeup ring, a deformable seal within the collar adjacent the reference shoulder abuts the side of the nose end of an inserted pin. Also, a seal ring in the exterior end of the collar engages the opposite end of the pin. Thus metal-to-metal contact assures a precise axial position in which there is full dimensional engagement of thread surfaces, while the threaded region is sealed off by compressed seals and solely required to react against axial stresses along the pipe. Neither internal pressure within the pipe nor external pressure can penetrate into the threaded region. However, at the same time, a selected bearing pressure may be established for a given axial stress by selection of a collar having a particular spacing between the reference surfaces on the internal makeup ring. If the interior seal is damaged or lost, the external seal still provides a barrier to a predetermined pressure threshold. However, if pressure continues to build up, the exterior seal releases to vent to the outside, this seal again becoming effective against external pressure thereafter. The internal ring surface may be disposed flush with the internal diameter of the pipe, reducing internal turbulence to a minimum.

In one example of a coupling in accordance with the invention, a standard A.P.I. collar may readily be modified by removal of the threaded central crest within the collar to provide a seat for a compressible seal ring within which is fitted a precision position ring. Opposite ends of the seal ring have tapered surfaces that mate with side bevels of the nose of an engaged pin. At the end recesses of the collar, outside the load bearing region, grooves are provided to receive elastomeric seal rings. These rings engage the pin just outside the last scratch mark and compress further in response to external pressure. However, they also release outwardly in response to internal pressure in excess of a predetermined threshold, while thereafter retaining their effectiveness as external seals. The grooves in which they are seated have side walls forming a diverging angle so as to provide frictional restraint against rotation of the seal ring during pin engagement.

In methods in accordance with the invention, selection of proper reference shoulder position and modification of pipe collars, if necessary, are accomplished while making up half of the coupling away from the rig floor. One pin is threaded into a desired insertion position with adequate thread engagement but without excessive stress. For modified A.P.I. pipe the position may be defined by a temporary reference member which is thereafter removed so that a position ring may be placed in abutment with the nose of the inserted pin. In this position the internal seal is contacted by the nose of the pin and the external seal is under compression at the root of the threaded portion of the pin. The position ring then defines the positional reference for the nose of the opposite pin. The only step required for makeup of the pipe length in the pipe string on the rig floor is to rotate the next pin into metal-to-metal contact with the opposed reference shoulder. At this point, both the interior and exterior seals are properly engaged on the newly inserted pin as well as the other half of the coupling. Existing collars may be modified at the pipe rack by removing the central crest portion of the threaded region and inserting a center seal ring. The precision makeup ring may be of selected length, so as to control the tightness of the makeup for given axial stress conditions.

Further in accordance with the invention, prescreening of pins and collars for taper is employed to provide that insertion positions will vary only within a limited range (e.g. ±⅛" total). A smooth interior taper on a reference ring that fits over a pin end is used to establish that the pin taper is acceptable, while a smooth reference cone may be used to make a similar check on the collar taper. The prescreening eliminates only a minor proportion of pipe and collars meeting A.P.I. standards, but reliably establishes that pipe position relative to the collar will assure seal integrity and performance under tensile loads. In the course of coupling pipe to modified A.P.I. collars, precision reference elements are threaded into the collars to control the depth of insertion of the first pin into the collar. Thereafter this element is removed so that the seal and precision makeup ring can be inserted.

In another example of a device in accordance with the invention, the collar is manufactured to incorporate an integral precision position ring, having reference shoulders on opposite sides and inset internal seals at the juncture of the threaded regions with each of the reference shoulders, as well as exterior seals in the end recess regions. Such collars provide greater resistance to bending, and expansion due to mid-region pressure, and may therefore be used with benefit in directional wells. In using these collars to make up pipe strings, adequate seals and thread engagement are both assured simply by assuring metal-to-metal contact of both pins against the respective reference shoulders of the position ring.

Couplings in accordance with the invention are particularly suitable for use with plastic coated pipe because the abutting metal surfaces provide a complete plastic seal without special modification. In spraying the interior of the pipe and precision makeup ring adequate coating is applied to the side surfaces, so that when they are brought together and compressed corrosive gases interior to the coupling are blocked even from the internal seal. Further in accordance with the invention, a ridged contact surface is provided on the reference shoulders of a precision makeup ring. An inserted pin end that is slightly canted relative to the plane of the reference shoulder tends to wipe and deform the ridged portion in reaching full engagement, so that complete contact is established. In accordance with a different feature, a modified or bullet-nose A.P.I. pipe may be matingly received by a modified collar using a two-piece seal ring and having a concave reference shoulder surface.

BRIEF DESCRIPTION OF THE DRAWINGS

A better understanding of the invention may be had by reference to the following description, taken in conjunction with the accompanying drawings, in which:

FIG. 5 is a fragmentary sectional view showing an end seal in uncompressed form;

DETAILED DESCRIPTION OF THE INVENTION

Figure 1:
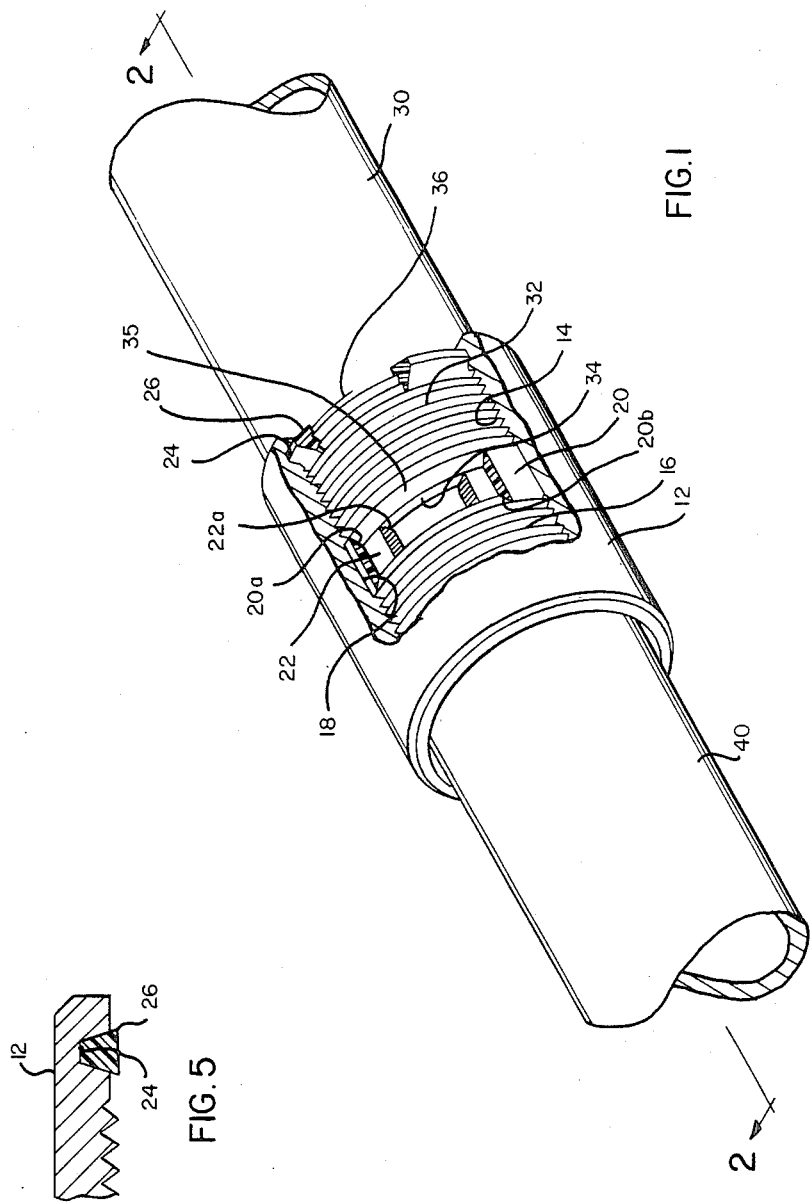
FIG. 1 is a perspective view, partially broken away, of a coupling using modified A.P.I. elements in accordance with the invention.

In accordance with the invention, referring now to FIGS. 1-5, a coupling 10 for production wells comprises a modified-A.P.I.-type tubing or casing. The collar or box 12 has conventional first and second threaded tapers diverging from the central collar region, the dimensions and tolerances being within the specified A.P.I. limits. In the standard A.P.I. collar the threaded tapers 14, 16 come together at a central crest region, which in accordance with the invention is machined out to provide a center land 18 which forms a seat for an interior seal ring 20 having tapered edges at each side. This seal ring is preferably made of a material sold as "RYTON" by the Phillips Petroleum. This material is an elastomer that is displaceable under applied force and pressure to provide a leak free seal, and is capable of withstanding the corrosive chemicals, such as hydrogen sulfide, pressures and temperatures encountered in deep completion operations. It also expands (up to 3%) under high temperature conditions, providing a better seal in more critical environments.

Figure 2:
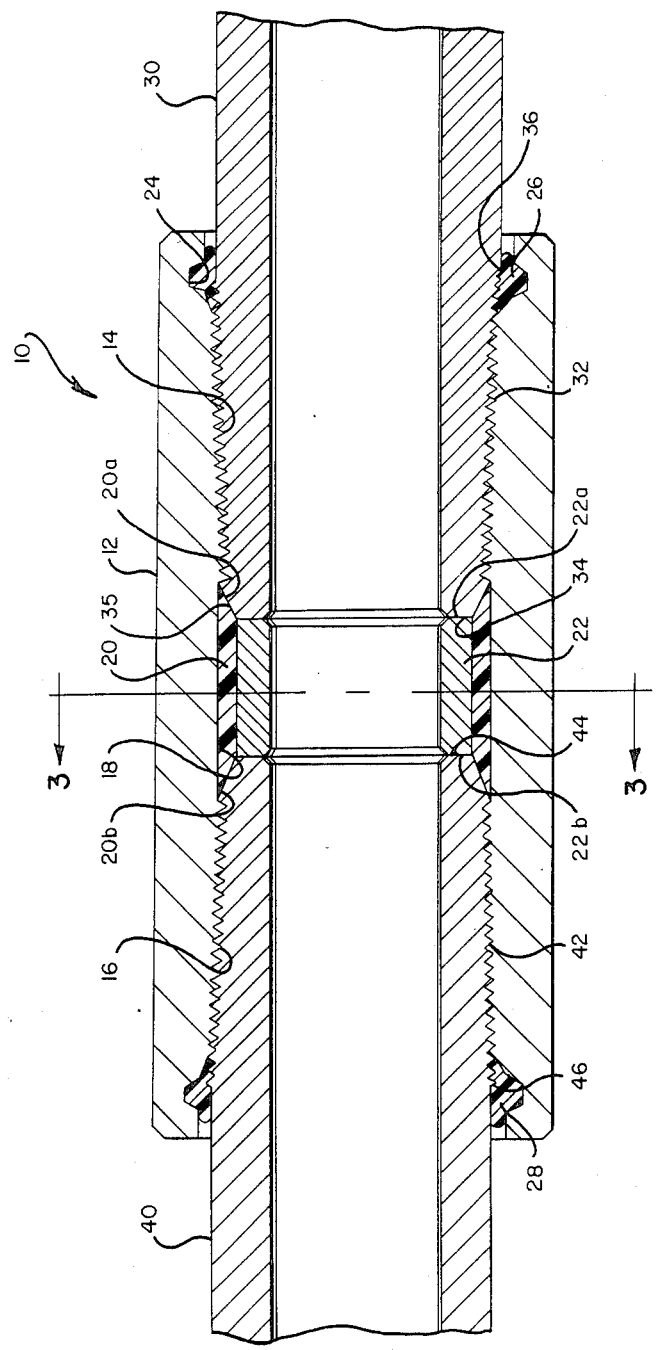
FIG. 2 is a side sectional view of the arrangement of FIG. 1.
Figure 3:
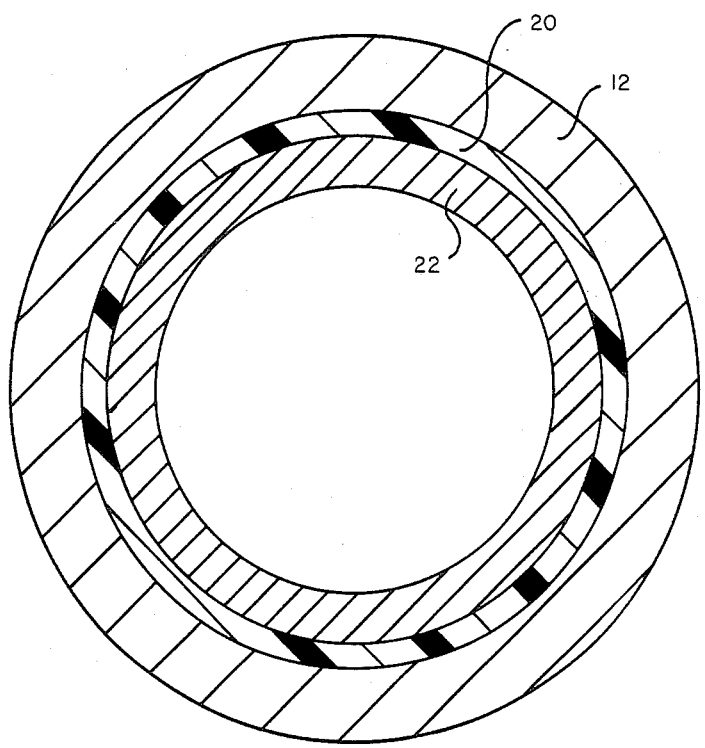
FIG. 3 is a cross-sectional view of the arrangement of FIGS. 1 and 2 taken along the line 3—3 in FIG. 2.
Figure 4:
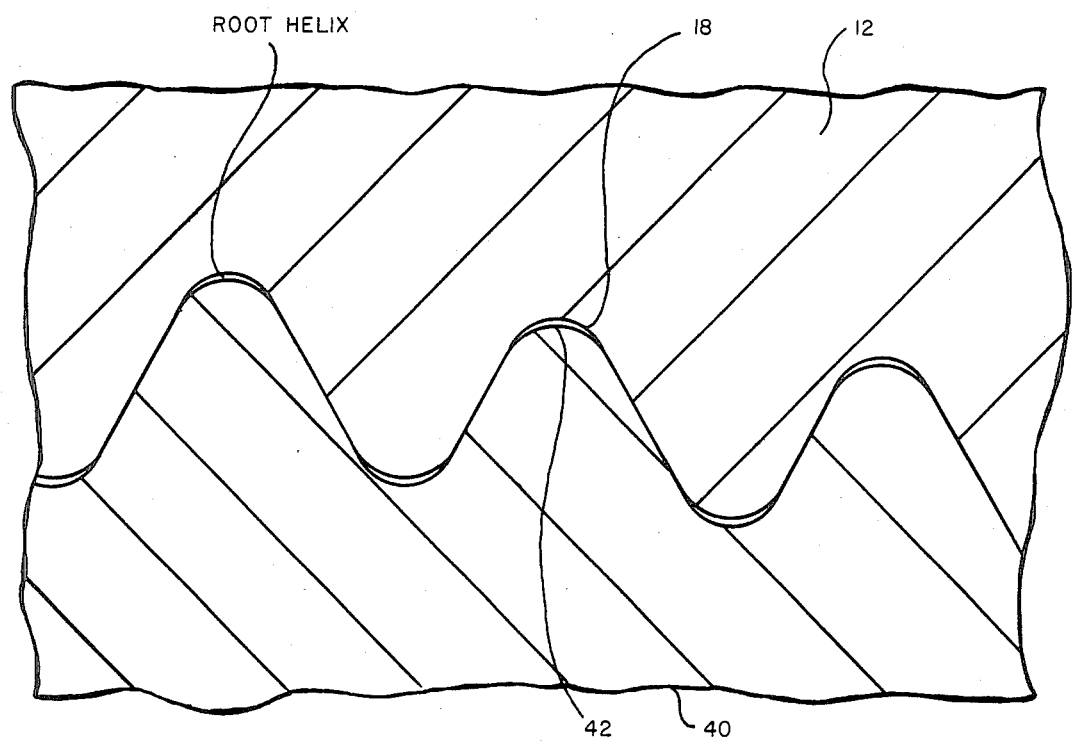
FIG. 4 is an enlarged fragmentary side sectional view of the threaded region in the arrangement of FIGS. 1-3.
Figure 6:
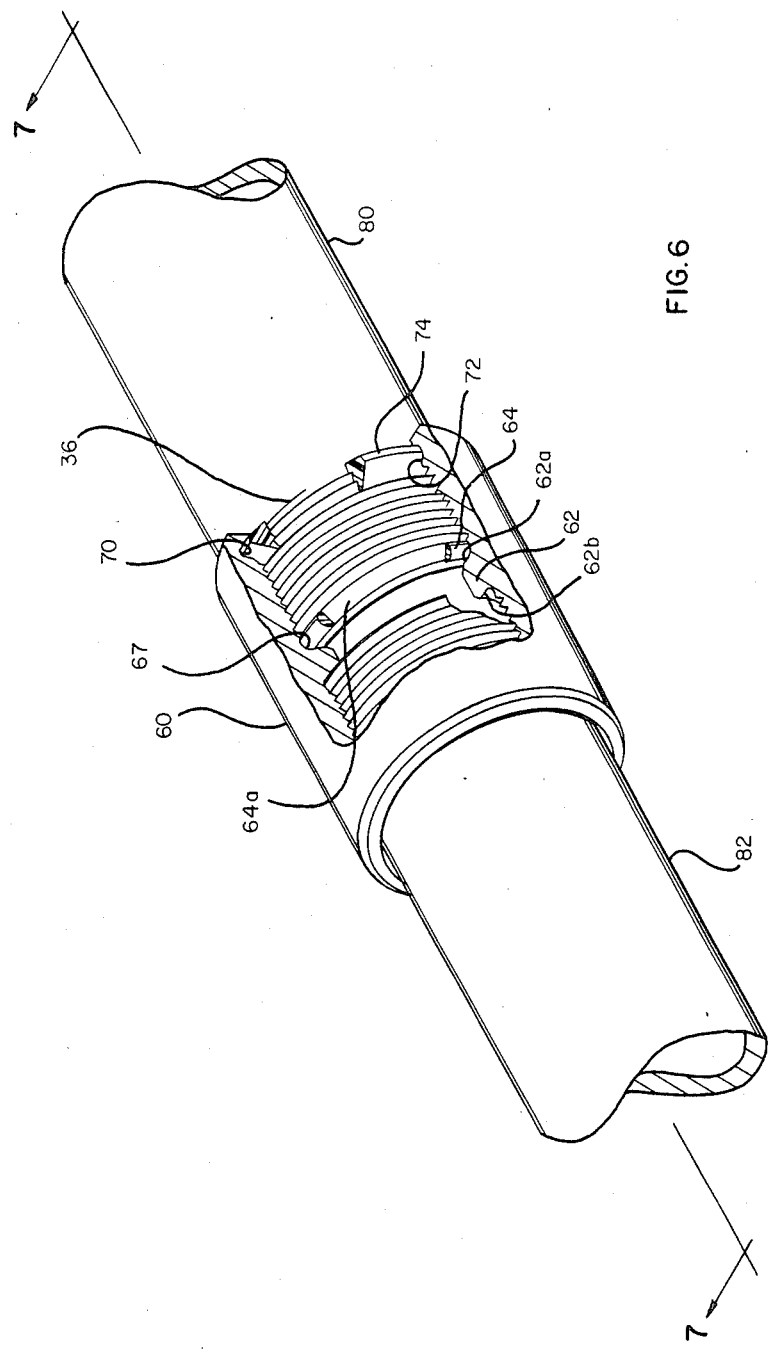
FIG. 6 is a perspective view, partially broken away, of a different coupling in accordance with the invention.
Figure 7:
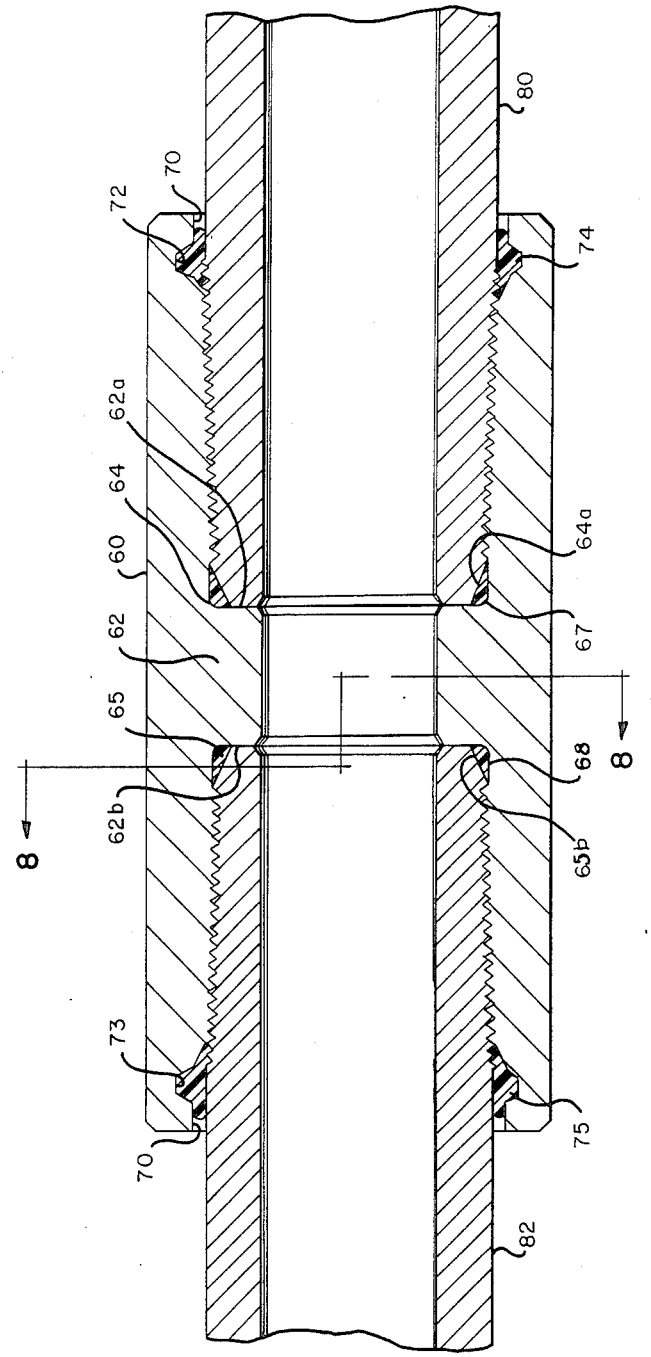
FIG. 7 is a side sectional view of the arrangement of FIG. 6.
Figure 8:
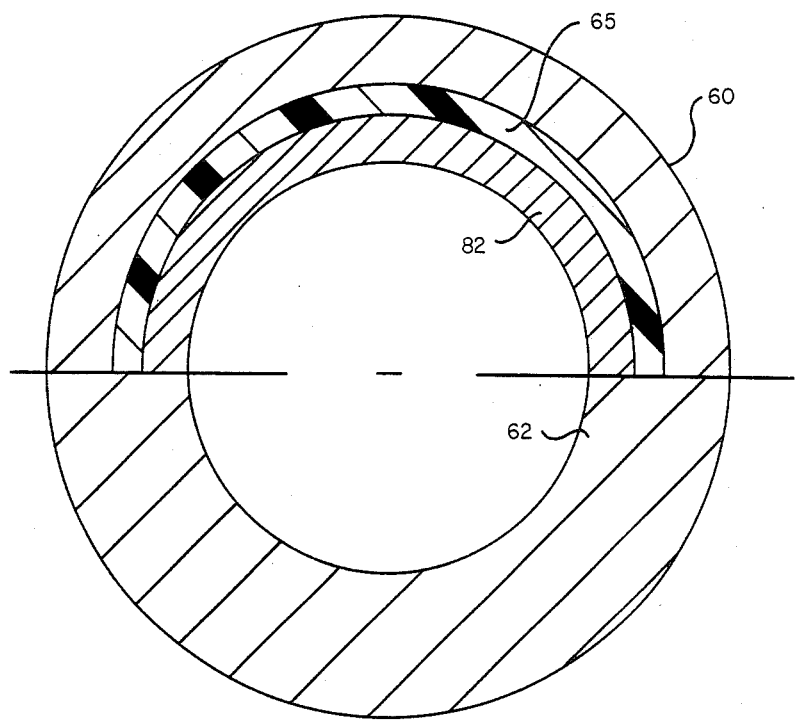
FIG. 8 is a cross-sectional view taken along the line 8—8 in FIG. 7 and looking in the direction of the appended arrows.
Figure 9:
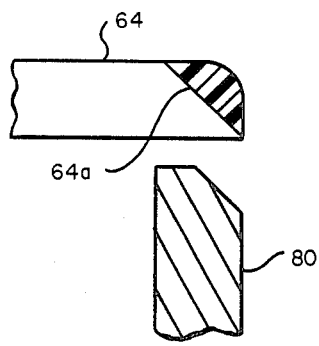
FIG. 9 is a fragmentary sectional view of the manner in which the nose end of a pipe, somewhat idealized, engages the seal ring.

Within the interior seal ring 20 is disposed a precision position ring 22 having a longitudinal dimension along the axis of the collar 12 that is selected for the particular type and size of collar that is used, also with a thickness to match the wall thickness of the pipe body to be used. As described below, the weight and grade of pipe being used, together with the bearing pressure desired for makeup, determine the axial spacing that is to exist between the reference shoulders 22a, 22b. The pipe wall thickness determines the radius of the position ring 22, in order that a flush profile can be established. At each outer end of the collar, in the "end recess" portion, immediately adjacent each threaded taper region 14 and 16, is machined an end groove seat 24 within which is seated an exterior seal ring 26. The pin end of a first pipe 30 is threaded into the collar 12 such that the threaded taper 32 on the pipe 30 is in secure engagement with the opposed threaded taper 14 of the collar, with the nose 34 of the pipe 30 being in engagement with a first reference shoulder 22a on the ring 22. The manner in which the depth of engagement of the first pipe 30 may be controlled is described in detail hereafter. However, when properly positioned, the nose 34 of the first pipe 30 not only engages the first reference shoulder 22a, but compresses the side surfaces of the interior seal ring 20. A 25° bevel surface 35 on the pipe 30 adjacent the nose 34 engages a similarly beveled seal surface 20a on the center seal ring 20, forming a firm seal against high interior pressure. The last thread region 36 of the first pipe 30, i.e. the region of maximum diameter adjacent the threaded taper 32 concurrently engages the exterior seal ring 26, compressing it inwardly relative to the collar 12. This forms a firm seal that is only further compressed by exterior pressure. As best seen in FIGS. 2 and 5, the side surfaces of the seal ring 26 taper outwardly at approximately a 60° angle from the end groove seat 24 in the end recess of the collar 12. This is a mechanically unloaded portion of the collar, being outside the threaded region, and can readily withstand the external pressures that are likely to be exerted. The diverging angle on the seal 26 provides a greater surface area of contact against the bottom and side walls of the end frictional engagement. A lubricant may be spread on the inside of the seal ring 26, so when it is engaged by the last thread region 36 of the pipe 30, the beveled side edges and narrow end of the seal ring 26 frictionally engage the groove seat 24, substantially eliminating any tendency of the seal ring 26 to rotate or do anything other than compress relative to the inserted pipe 30.

In similar fashion, a second pipe having a threaded taper 42 in engagement with the second threaded taper 16 on the collar, abuts the second reference shoulder 22b, and its nose 44 compresses the tapered side surface 20b of the interior seal ring 20, while its base 46 compresses the second exterior seal ring 28. It will be appreciated that thread lubrication compound is used in the threaded engagement regions, being applied prior to makeup. Further, the amount of deformation of the various seals can be greater or less than is shown (the drawings are not to scale), inasmuch as internal and external pressures respectively merely act on the seals 20, 26 and 28 in senses that tend to increase the integrity of the seal.

With this structure in accordance with the invention, a coupling is provided that satisfies a number of requirements that have hitherto involved limiting compromises. Load bearing strength is provided by virtue of precise thread engagement, which is established by metal-to-metal contact between the noses 34, 44 of the pins and the facing reference shoulders 22a, 22b. Pipe tolerances are adequate to insure load-bearing strength, even though a high pressure seal may not exist in the threaded area from bearing pressure alone. However, the sealing requirements are met concurrently, because with the pipe ends being positioned accurately, the interior seal 20 and the exterior seals 26 and 28 are engaged and compressed securely. Consequently the threaded engagement region is not under ordinary circumstances exposed to any such leakage. Concurrently, the interior surface of the position ring 22 lies flush with the interior surface of the pipes 30, 40, so that flow passing along the string does not encounter a turbulent region in the middle of the coupling. In addition, the abutment of the pipe noses against the opposite reference surfaces 22a, 22b of the ring 22, provides a constricted path that considerably limits any tendency of internal pressurized gases or fluids to penetrate outwardly.

At the outer ends of the collar 12, the exterior seal rings 26, 28 are so shaped and positioned that they are compressed by the last thread regions 36, 46 of the engaging pipe. Exterior pressure again increases the integrity of the seals. In the event that the interior seal 20 is damaged or defective, so that leakage of internal fluid passes into the threaded region, distortion of the exterior seal rings 26, 28 is adequate to limit outward leaks up to a certain pressure limit. Selection of the size and shape of the exterior seals 26, 28 is readily variable to provide resistance to internal pressures of a selected amount. A slight taper to match the thread taper and an inner diameter that is sufficiently large to clear the pipe threads to about the mid-region are best seen in the uncompressed state evidenced in FIG. 5. These geometries provide firm sealing in response to external pressures, but adequate deformation to release internal pressures in excess of a selected level, here about 2000 psi. Size and taper variations may be used to increase or decrease the chosen threshold level. Consequently, at internal pressures in excess of the selected threshold, the gases are vented outside the tubing rather than having the coupling come completely loose. The seal rings 26, 28 maintain their integrity and, when venting has ceased, again function as effective barriers against external pressure.

From the standpoint of mechanical loading stresses arising in a long tubing or casing string, therefore, it is not necessary with this concept to provide an extremely tight makeup in order to establish a leak-free seal. Bearing stresses can be defined solely in terms of the axial load (e.g. length and weight of string) to be utilized. This therefore constitutes a marked departure from accepted practice, in which the end region of a pipe is stressed to approach the yield point so as to assure a leak-free seal, with the resultant galling, reduction of number of uses and dangers of overstressing that can occur. Production rig testing procedures, such as those which test a coupling by exposing it to high pressure gases which are then sensed for leakage or fluids such as water or water treated with soluble oil, are furthermore needed in fewer situations. For the same reason, A.P.I. standard pipe can be used for a wider range of applications involving higher pressures and axial stresses. The much more expensive couplings and pipe currently employed for extremely long tubing or casing strings and high pressure applications can be confined to a smaller number of the more critical situations. Pipe with imperfections and defects pertaining to the sealing functions only may now be usable.

Selection of grade and weight of tubing for a particular application can thus be accompanied by a selection of the degree of engagement required for particular casing and completion conditions. For example, some gas wells require only short strings, but are at extremely high pressures, and for these applications axial stress loading is much less than for extremely long strings. Consequently, for such applications a lesser tightness of thread engagement is used, so that both assembly and disassembly of tubing strings can be accomplished more rapidly. For this purpose, systems in accordance with the invention can utilize one of a number of available precision makeup rings. A set of four different axial length sizes of precision makeup rings 22 and seal rings 20 are sufficient to cover all ranges of application. In the present example, for 8 round A.P.I. pipe, these vary from ¾" for the smallest to 1¼" for the largest. In other words, couplings which are to withstand high stress can be given two turns (1 turn=⅛") more on each pin relative to the couplings which are least firmly engaged and which therefore have longer makeup rings. Any intermediate spacings that are desired can be used between these limits, but only two intermediate dimensions between the limits (four in all) are generally found sufficient. By changing the length of the seal ring 20 correspondingly the beveled surface 20a providing the interior seal still securely engages the side bevel adjacent the nose of the pin. It will be recognized that the seating area established by removing the crest of the threads is also similarly proportioned.

In systems in accordance with the invention, it should be noted that pipe taper is the only significant variable, both dimension and angle being encompassed. Techniques are disclosed hereafter for testing whether pipe tapers are within an acceptable range, with a minor proportion of pipe being rejected for this reason. Having prescreened the pipe for this characteristic, the metal-to-metal contact that is positively assured when the pin noses engage the adjacent reference shoulders automatically insures both the internal and external seals. It should further be noted that there are no internal stress risers introduced by the sealing structure, that the full integrity of thread engagement is maintained, and that all conventional features of operation are maintained. Coupling of the collar to the pipe to the hand tight plane remains as before. If permissible under field conditions a visual check may be made of the last scratch position relative to the collar when engaged.

With modified A.P.I. structures in accordance with the invention, existing stock can be converted to improved coupling simply by removing the threads in the center crest to provide the center seal seat 18 and by machining the end groove seats 24 in the end recesses of the collar 12. The prefabricated center seal ring 20 and the exterior seal rings 26, 28 can be inserted by hand, but the precision position ring 22 requires considerable force to insert in position against a reference surface, as described hereinafter. This type of work can all be accomplished at a pipe rack or pipe storage facility and requires no special machining procedures because this type of equipment is used in regular assembly, inspection and maintenance of pipe.

Where a factory supplied collar 60 is to be used, the construction may be as shown in FIGS. 6-9, to which reference is now made. The collar 60 incorporates a central position reference ring 62 that is integral with the collar 60 body and has an inner circumference flush with the inner circumferences of engaged pipe, and end shoulders 62a, 62b that are axially separated by a selected spacing. Four different spacings within a predetermined range may again be used for providing different makeup tightness, as described previously. First and second center seals 64, 65 are positioned in grooves 67, 68 each disposed between a different end shoulder 62a or 62b and the adjacent threaded portion of the collar 60. These seals 64, 65 include beveled surfaces 64a, 65a for mating with the 25° side bevel surfaces on the pipe, as previously described.

At the end recesses 70 of the collar 60, a pair of groove seats 72, 73 retain end seals 74, 75 as previously described.

It may be seen that the construction of FIGS. 6-9 has all of the characteristic advantages of the arrangement of FIGS. 1-5. Full but not excessive thread engagement is assured when the first and second pipes 80, 81 are fully engaged with nose-to-metal contact with the end shoulders 62a, 62b respectively. Concurrently, secure center and end seals are established as previously described. This unit has the additional advantage of providing greater versatility in assembly, because precise couplings can be fully made on the rig floor. In addition, the manufactured coupling has a thick integral center section and therefore is much stronger in bending, and much more resistive to expansion due to internal pressures. Consequently such couplings are preferred for use in situations in which the string has a high slant angle or changes in direction combined with high pressure.

Figure 10:
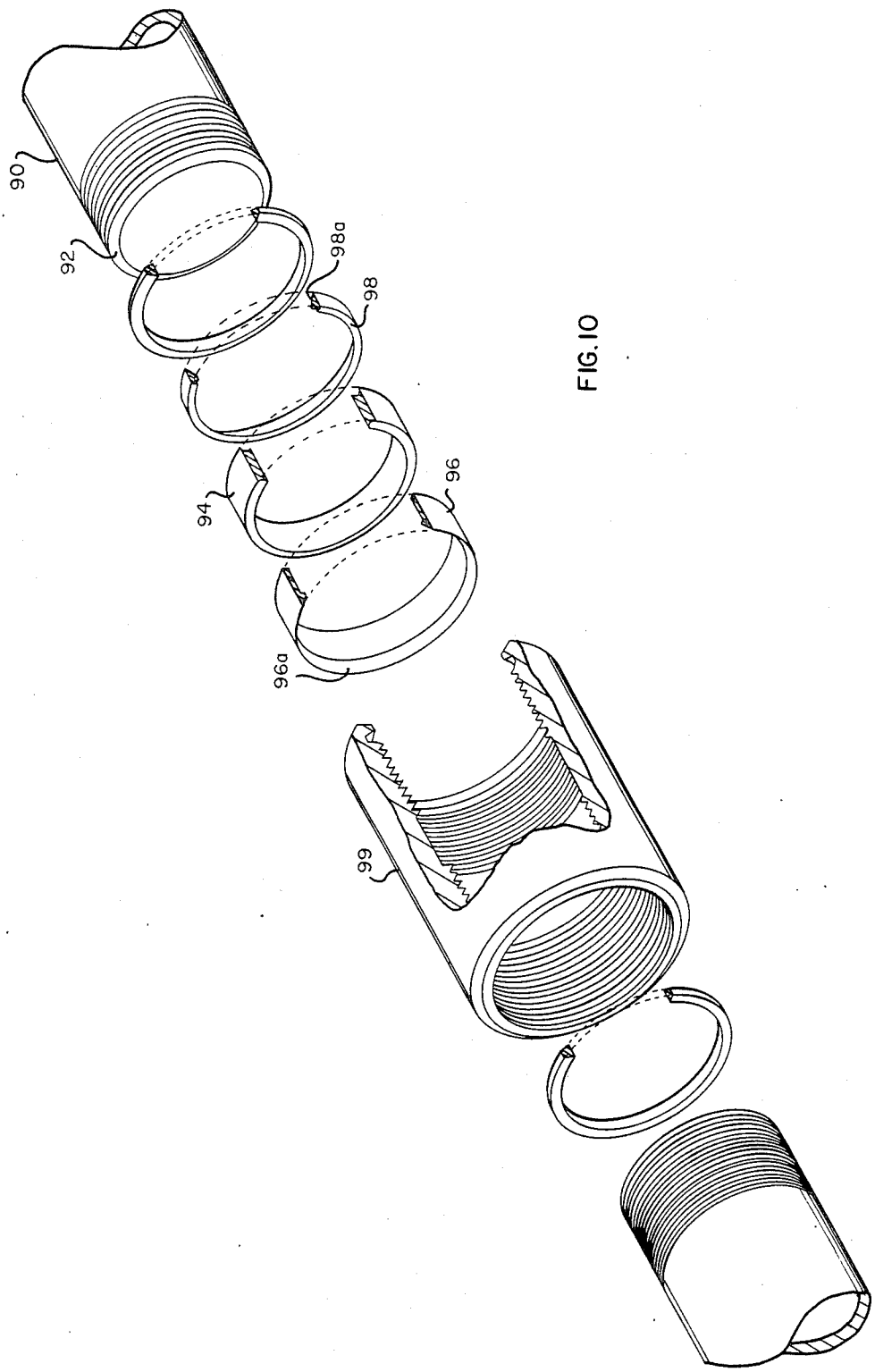
FIG. 10 is an exploded fragmentary view of a different example of a coupling in accordance with the invention used with bullet-nosed pipe.
Figure 11:
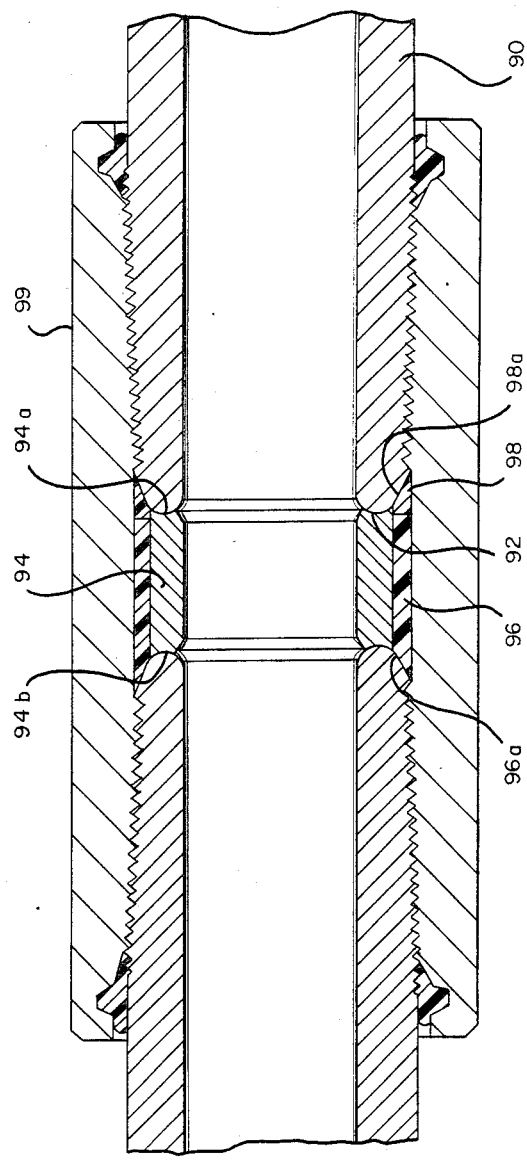
FIG. 11 is a side sectional view of the assembled construction of FIG. 10.

The system is also amenable to usage with so-called bullet-nosed pipe, as shown in FIGS. 10 and 11. Bullet-nosed pipe 90 has had the pipe end 92 machined to a convex configuration as opposed to the flat end and side bevel previously described. For this type of pipe 90, the precision makeup ring 94 incorporates concave side reference surfaces 94a and 94b while the center seal is fabricated in two parts of a principal seal ring 96 having a concave side surface 96a, and a minor seal ring 98 with a concave side seal surface 98a. As shown in FIG. 10, the side seal surfaces 96a and 98a in the uncompressed condition are oversize relative to the precision makeup ring 94, and internally projecting portions of the concave side surfaces 96a, 98a would be damaged if the ring 94 were forced in over them. Thus this unit is assembled first by putting in the principal seal 96, sliding the makeup ring 94 over the flat interior surface on the principal ring 96, and thereafter inserting the minor seal ring 98 so that there is full metal and seal contact to the bullet noses of the pipe 90. The collar 99 remains as described above in conjunction with FIGS. 1-5.

Figure 12:
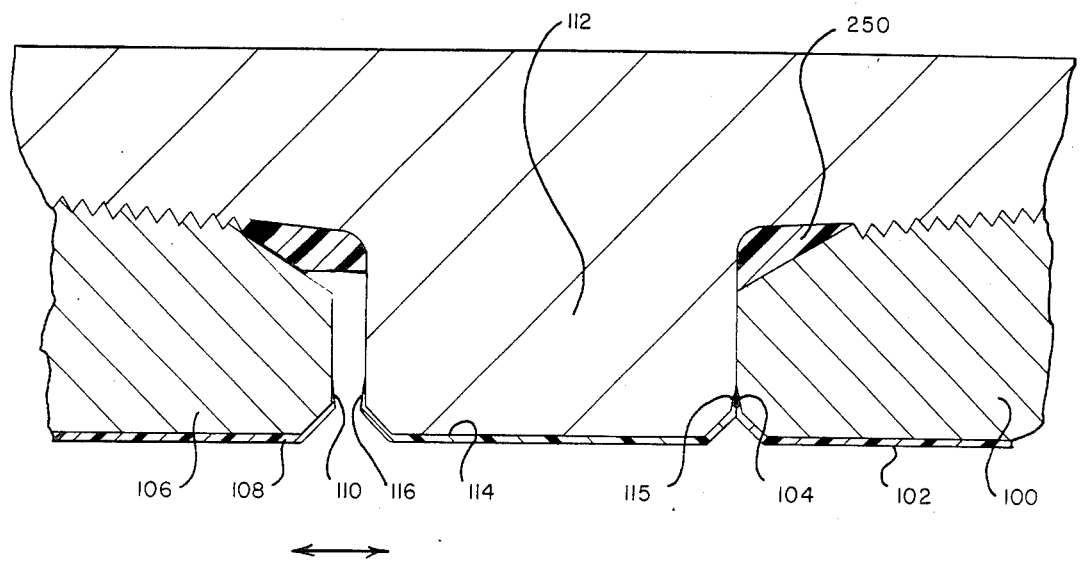
FIG. 12 is a side sectional view of an example of the invention as utilized with plastic coated pipe.

The example of FIG. 12 illustrates important advantages of constructions in accordance with the present invention for plastic-coated pipe, which is now much widely used for the superior resistance of the pipe to extremely corrosive environments. The practice generally is to roughen the interior surface of the pipe so as to provide better adhesion of the temperature and corrosion resistant synthetic polymer-based mixture (e.g. "RYTON") that is used. In addition, masking techniques are used to apply plastic from the inside of the pipe in a path that extends around the nose and beveled sections and to two or three threads of the pipe. With standard A.P.I. pipe couplings the danger regions are at the corners encountered at the pipe ends, because of the fact that the applied plastic is thinner in these regions, and at the threaded portions, because thread engagement when inserted into the collar tends to tear and crack rather than compress the plastic.

In accordance with the invention, as shown in enlarged form in FIG. 12, a first pipe 100 having an adhering plastic layer 102 on the inside surface will also receive a lesser amount of overspray 104 at the nose end corner of the pipe 100. A second pipe 106 has a similar interior layer 108 with an overspray region 110 immediately adjoining at the pipe nose. This is all of the marginal coating that is required, inasmuch as the precision makeup ring 112, having an internally roughened surface, also includes an interior surface layer 114 of plastic, some of which extends onto the side edge surfaces as lip surfaces 115, 116. Thus, when metal-to-metal contact is established, the overspray 104 and 110 areas on the pipe 100, 106 respectively are compressed against the plastic lip surfaces 115, 116, compressing and displacing the surfaces to provide a complete seal along the length of the pipe. In addition, the flush inner surface of the ring 112 with the pipe inner circumferences greatly reduces the turbulence in this area, and the high velocity forces that would otherwise act on the pipe edges, where the plastic coating would be the most thin.

Field use of systems and devices in accordance with the invention is greatly facilitated by prescreening of pipe so that pipes which have excessively shallow or steep tapers are not used. API standards permit degrees of taper variations which are sufficient to allow combinations at opposite extremes (shallow taper on the collar with a steep taper on the pin or vice versa) of ±2 threads, which gives a total variation of one-half inch. In accordance with the present invention, however, it is desired to use pipe whose taper varies so as to give a maximum difference of one thread on the maximum side. This constitutes a maximum variation of one-eighth inch from the nominal position, and solely arises from the taper, not the condition or the tolerances of the threads themselves. Field experience has shown that only 2% to 6% of pipe manufactured to A.P.I. tolerances will not meet this requirement, but this factor must be checked in the field, at the pipe rack or similar station, prior to engagement of the collar onto the pipe. The ring 120 of FIG. 14 and the plug 130 of FIG. 15 provide convenient mechanisms for this prescreening.

Figure 14:
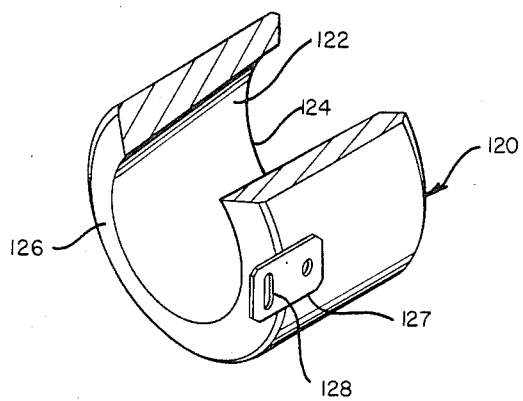
FIG. 14 is a perspective view, partially broken away, of a precision reference cone ring that may be used in assembly techniques in accordance with the invention.
Figure 15:
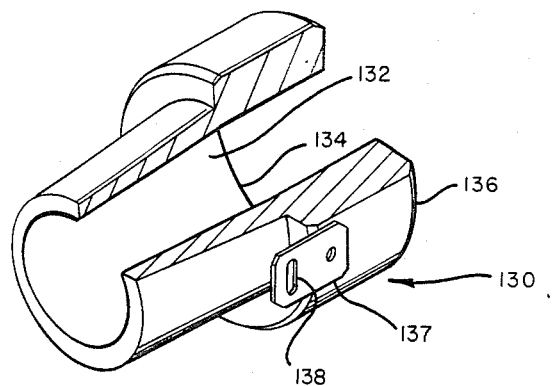
FIG. 15 is a perspective view, partially broken away, of a precision reference cone plug that may be used in assembly techniques.

The gauge ring 120 of FIG. 14, to which reference is now made, includes an interior conical surface 122 tapering from a wider end 124 to a narrower end 126 of the ring. An ear 127 attached adjacent the narrower end 126 includes a viewing window 128 having an axial length along the central axis of the ring 120 that corresponds to an acceptable range of displacements for the nose end of a pin inserted into the opening defined by the interior conical surface 122. When the ring 120 is fitted over the nose end of a pipe which has a shallower taper than a standard defined by the smooth interior conical surface 122, (the diameter of the pipe being substantially invariant) the ring 120 will not slip over the threaded portion until the pipe end is within the center of the viewing window 128 as desired, but will instead be closer to the smaller end 126 of the cone 120. If, on the other hand, the taper is sharper or steeper than the desired standard, then the end of the pin will penetrate past the center of the viewing window 128. In either event the pipe is unacceptable if the nose does not rest somewhere within the boundaries of the viewing window 128.

In like fashion, a gauge plug 130 may be used for checking the taper on the collars. A smooth conical surface 132 tapers together from an insertion end 134 within a larger base 136, from which extends an ear 137 incorporating a viewing window 138 if the taper on the collar is too shallow, the penetration will be less, and the end of the collar will not reach the viewing window 138, whereas if the taper is steeper the penetration will be past the viewing window 138. In both instances, the relative position of the end of the tubular member is directly dependent upon the taper, which is established by the smooth internal or external reference surface of the ring 120 or plug 130.

Figure 16:
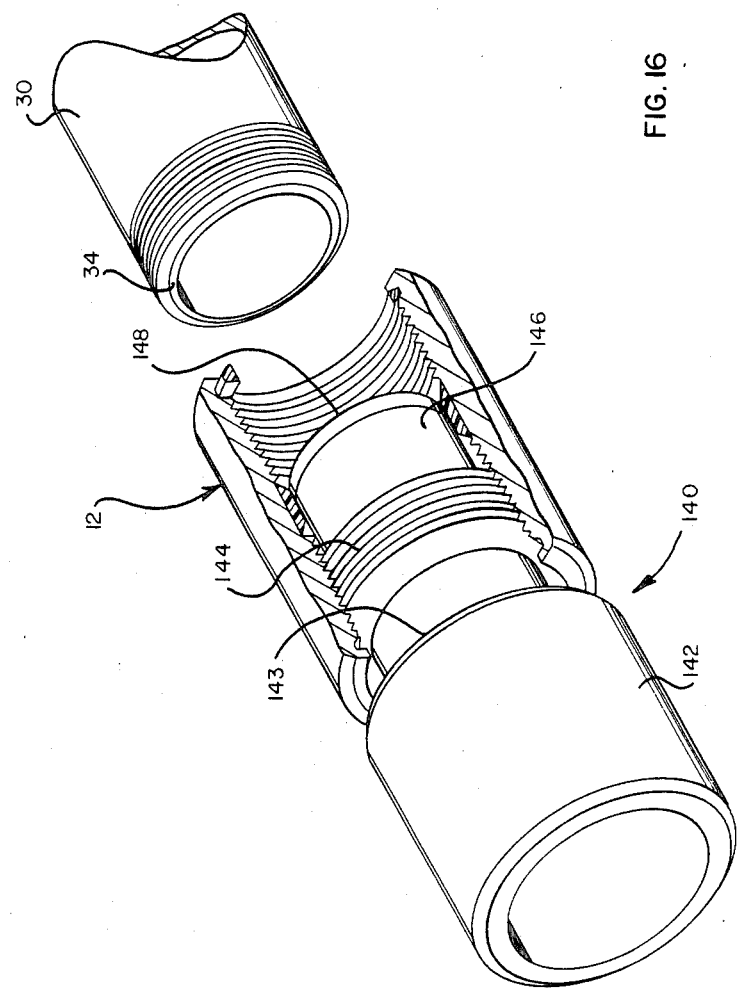
FIG. 16 is a perspective view of a reference insertion plug that may be utilized in assembly techniques in accordance with the invention.

One other tool is valuable in assembly techniques in accordance with the invention, and this is shown as a preset plug 140 in FIG. 16. The preset plug 140 comprises a body portion 142 used for hand or machine tightening and removal with a bucking tool. Accordingly, the body 142 has a circular outer surface terminating in a reference shoulder 143 that lies in a plane normal to the central axis of the body. A threaded portion 144 stands coaxially from the body 142 to define a precision male threaded region for mating with an A.P.I. collar 12 of the desired type. An end 146 of the preset plug 140 projecting beyond the threaded portion 144 includes a replaceable hardened end face 148 which is precisely spaced apart from the reference shoulder 143. When the plug 140 is threaded into a collar 12, the reference shoulder 143 is engaged against the end of the collar. Then, the end face 148 is in a known position, defining the depth of penetration for a first pipe 30 to be inserted from the opposite end. The pipe 30 is simply tightened until metal-to-metal contact is obtained between the nose 34 of the pipe and the end face 148. Thereafter, with the pin 30 in position, the preset plug 140 is removed, so that a center seal and a precision makeup ring (not shown) can then be seated against the nose of the engaged pipe and the coupling fully readied for use on the rig floor.

Figure 13:
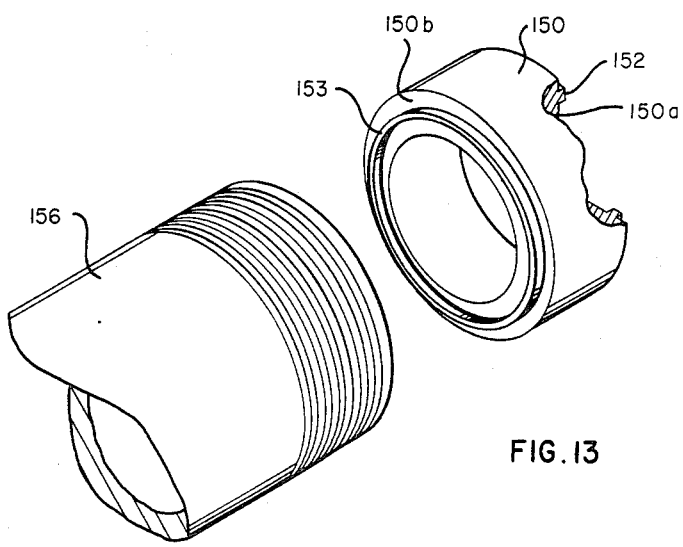
FIG. 13 is a perspective view of a modified precision makeup ring that may be utilized to compensate for pin irregularities.

A modification of the precision position ring, which can be used on integral as well as inserted rings, is shown in FIG. 13. This ring 150 (shown as a separate insertable element for modified A.P.I. pipe for purposes of illustration only) has spaced apart reference shoulders 150a, 150b as previously described. However, these surfaces include concentric, centrally disposed, ridges 152, 153 respectively. If the nose end of an inserted pipe 156 is not in a plane precisely parallel to the opposed reference shoulder 150b, the forward edge of the nose tends to cut a deepening groove in the reference shoulder before full contact is achieved. This lack of parallelism occurs because the pipe end is not precisely cut off in fabrication and although it may not exceed a few mils, the discrepancy can have a greater effect on the precise positioning of the pipe 156 relative to the reference shoulder 150b and seals (not shown). When the deformable ridge is encountered, however, a wiping action takes place that conforms the contacting metal surfaces and assures full mating of the opposed elements around their peripheries on solid metal-to-metal contact.

Figure 17:
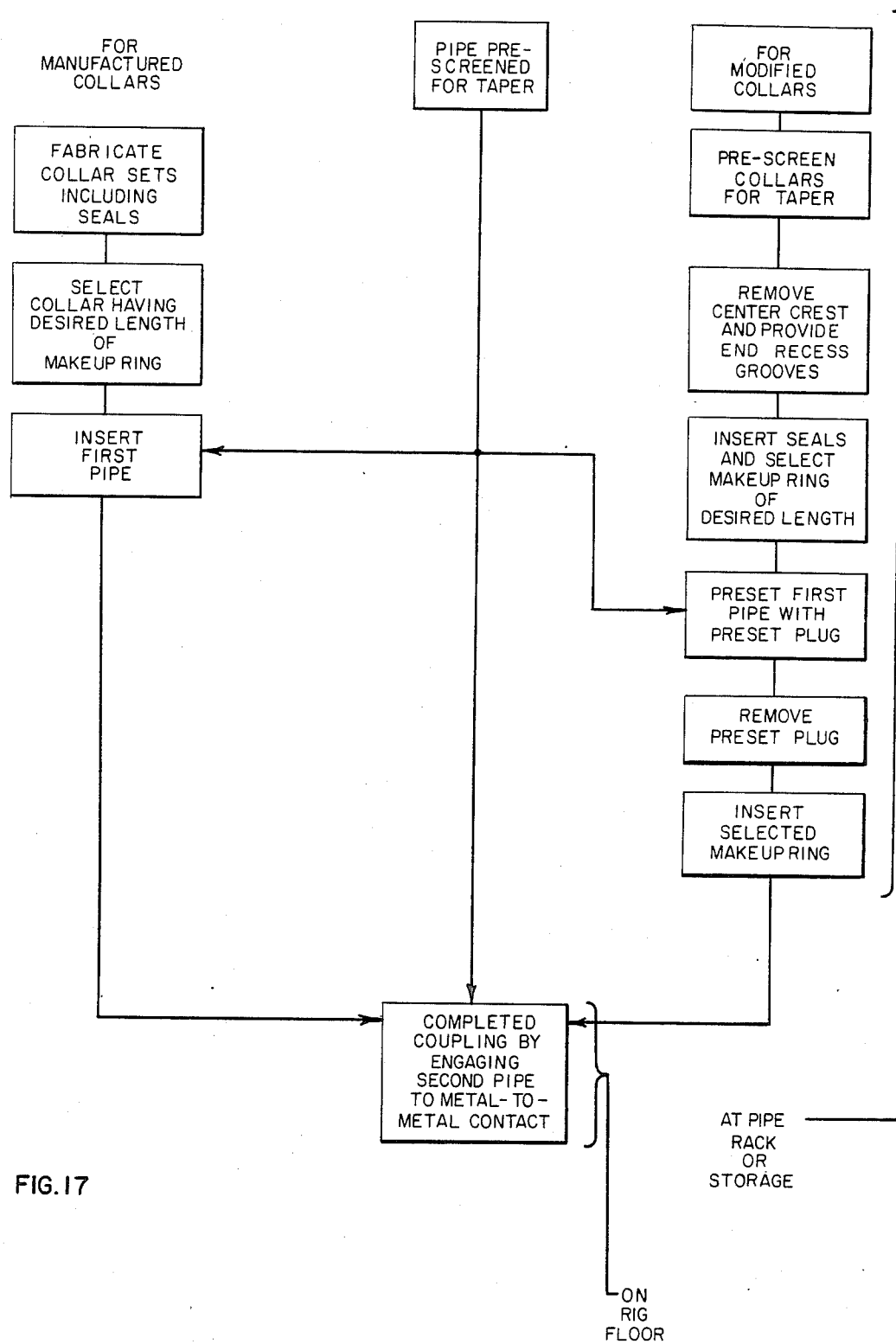
FIG. 17 is a flow diagram of steps that may be employed in methods in accordance with the invention.

Methods in accordance with the invention, depicted in sequential form in FIG. 17, may use modified or manufactured collars as described herein, but in any event preferably pre-screen the pipe. That is, the taper of each pin end is checked, using the reference ring of FIG. 14, to determine that the depth of penetration will be ±⅛″ relative to the standard. Only dimension and taper angle affect this determination, and it is not necessary to check thread pitch or profile. If a manufactured collar is to be used, it will previously have been pre-screened for taper during quality control checks, and it is only required to select the degree of makeup tightness desired for the axial stress to be encountered. On the basis of length of string and other conditions to be encountered, the axial stress to be met is determined by operating personnel in terms of grade and weight of pipe and dimensional penetration of the taper for the couplings. Selecting the collar having a particular length of makeup ring is determined by these criteria. Makeup of the couplings merely requires engagement until metal contact is made, for both pins, and this can be done at the pipe rack for one pin or on the rig floor for the opposing pins. The precise dimensional control that is achieved assures full thread engagement for withstanding tensile loads, without dangers of overstressing or deformation. It is not necessary to attempt to achieve a "power-tight makeup" in accordance with A.P.I. procedures or to increase bearing pressure until adequate sealing against high pressure is obtained. The internal and external elastomeric seals that are concurrently established on dimensional engagement provide superior barriers against pressure differentials. Because they also isolate the threaded region, the importance of thread continuity is diminished and thread cuts, marks or irregularities previously regarded as imperfections sufficient to constitute rejectable defects may now present no significant problem. Thus, pipe previously rejected for such imperfections may now be usable in many applications.

Where an A.P.I. collar is to be modified the sequence is longer but the end result on final makeup is the same. The collars also are prescreened for taper, using the reference cone of FIG. 15, to assure that they are within $\pm\frac{1}{8}''$ variance from standard. The acceptable collars are then modified by removing the central crest region of the threads to provide a seat for the center seal, and machining in the grooves in the end recesses. The center seating region is proportioned in length to the makeup ring and seal to be installed. The seal rings are then urged into position, which may be done manually, and the preset plug of FIG. 16 is inserted to maximum depth. The preset plug is chosen in correspondence to the makeup ring to be used, so that when fully engaged its end face is in the plane of full insertion of the nose end of a first pipe. By threading the first pipe into contact with the end face, the first pipe is precisely positioned and the preset plug may be removed. Insertion of the selected precision makeup ring into firm contact with the nose of the first pipe requires substantial force, so that a shouldered driving tool is used. When the makeup ring is in position, however, the coupling is ready to receive the second pipe on the rig floor. The crew need only stab and rotate each section into the prior section until metal contact is made with the makeup ring. This firm engagement alone is enough to assure a proper mechanical engagement and full sealing against both internal and external pressures.

Although it will be appreciated that a number of forms and modifications of systems, devices and methods in accordance with the invention have been described, it will be appreciated that the invention is not limited thereto but encompasses all variations and modifications falling within the scope of the appended claims.

What is claimed is:

1. A coupling collar for A. P. I. standard round or buttress thread tubing or casing having a nose surface at the end thereof, a side bevel adjacent the nose and having a specified angle relative to the longitudinal axis of the tubing or casing, a threaded region of pitch and thread depth in accordance with specified tolerances between the bevel and a last scratch mark, the threads diminishing to zero in the bevel and last scratch mark regions, the collar including threaded portions tapering oppositely from a central region with specified taper angles, the collar having tolerances closer than the tubing or casing tolerances and terminating in end recess portions adjacent the threaded portions and within which the ends of tubings or casings are to be matingly received, the end recess portions having inner diameters larger than the outer diameters of fully inserted tubings or casings, the collar comprising:

a central metal reference ring member coupled to the collar and having an inner diameter corresponding to the inner diameter of the tubings or casings and oppositely facing reference shoulders lying in planes perpendicular to the central axis of the collar and spaced apart by a predetermined distance related to an acceptable range of taper and size variations for the unmodified A. P. I. tubing or casing such that engagement of the nose of an unmodified A. P. I. tubing or casing against a reference shoulder of the ring member is determinative of the degree of thread engagement desired for the tubings or casings relative to the collar;

means defining central grooves in the collar, each disposed between a different one of the reference shoulders and the adjacent threaded portion and having a depth no greater than the depth of the threads;

a pair of central seal means, each positioned in a different central groove and proportioned to be engaged and compressed by the side bevel of the nose of the A. P. I. tubing or casing and to extend into the start of the threads on the side bevel when the nose of the tubing or casing is in contact with the ring member to provide a seal against internal pressures that cannot be displaced by such internal pressures;

means defining end grooves in each of the end recess portions outside the threaded portions of the collar; and a pair of end seals each disposed in a different one of the end grooves, the end seals each engaging the adjacent received A. P. I. tubing or casing in the region of the last scratch mark thereof and being dimensioned to be compressed into the inital threads in the last scratch mark region when the nose of the tubing or casing is in contact with the ring member to provide a seal against external pressures, the end seals being configured to deform outwardly into the end recess portion in response to internal pressures and thereafter return to position to provide sealing, whereby the collar is both adequately mechanically engaged in the threaded load bearing region and the threaded region is sealed at both ends such that the collar can matingly receive unmodified A. P. I. tubings or casings without the presence of weakened regions due to the introduction of mechanical stress risers in the collar and provides sealing of the threaded portions under varying conditions of operation.

2. The invention as set forth in claim 1 above, wherein the central metal reference ring member is integral with the collar, and wherein the collar further includes a pair of interior seal areas adjacent the juncture between the reference shoulders and the respective adjacent threaded portions in the collar, and wherein the central seal means comprises a pair of ring seals each disposed in a different one of the seal areas.

3. The invention as set forth in claim 1 above, wherein the collar is to receive internally plastic coated pipe, and wherein the metal reference ring member has a roughened inner diameter and a plastic coating thereon, the plastic coating at least partially extending over from the inner diameter around the corner onto the reference shoulders.

4. The invention as set forth in claim 1 above, wherein the surfaces defining the reference shoulders include individual ridges concentric therewith, said ridges being deformable by the forward end of a pipe, the plane of the end of which is not precisely parallel to the plane of the reference shoulder.

5. The invention as set forth in claim 1 above, wherein the collar is adapted for bullet-nosed pipe, and the metal reference ring member includes concave reference shoulder surfaces for mating with the end of the bullet-nosed pipe, and the pair of central seal means comprise a two section central seal ring, the collar including a removed central crest region defining a seal ring seating area, with the central seal ring further including a profile providing seal surfaces at each axial end thereof for mating with the abutting portion of a bullet-nosed pipe, whereby the seal surfaces and reference ring member may be positioned within the collar without distortion of the seal surfaces.

6. The invention as set forth in claim 1 above, wherein the side bevels of the tubing or casing are at approximately 25° angles relative to the axis of the collar and the pair of central seal means each has an inner surface with an approximately 25° angle relative to the axis of the collar, for engaging the beveled side surfaces of the tubing or casing to be inserted therein.

7. The invention as set forth in claim 6 above, wherein the end grooves in the collar have side surfaces diverging at an included angle of approximately 60° to provide a high surface area relative to the received end seal, such as to maintain frictional contact so that the end seal does not rotate during insertion of a tubing or casing.

8. The invention as set forth in claim 7 above, wherein the interior surfaces of the end seals are tapered to angles approximating those of the taper of the associated threaded region, and wherein the inner diameter of the end seals is sufficiently large to pass over at least a portion of the threaded region of a tubing or casing received therein before compression into the threads of the tubing or casing.

9. A pipe coupling collar for A. P. I. standard round or buttress thread pipe having a nose surface, a side bevel adjacent the nose and a last scratch mark, the collar comprising:
a removed central crest region defining a central cylindrical, seating region and threaded portions tapering oppositely from a central region with specified taper angles and tolerances and terminating in end recess portions adjacent the threaded portions and within which the ends of pipes are to be matingly received;
a central metal reference ring member within the sealing region and having an inner diameter corresponding to the inner diameter of the pipes and oppositely facing reference shoulders lying in planes perpendicular to the central axis of the collar and spaced apart by a predetermined distance related to an acceptable range of taper and size variations such that engagement of the nose of a pipe against the ring member is determinative of the degree of engagement desired for the pipes relative to the collar;
a seal ring disposed within the seating region coupling the ring member to the collar and having a center region of substantially constant inner diameter and tapered seal surfaces at each axial end thereof, wherein the reference ring member is disposed within the central seal ring in contact therewith, and wherein the reference shoulders on the ring member on opposite axial ends thereof are proximate each of the different seal surfaces, the seal surfaces defining a pair of central seal means, each disposed between a different one of the reference shoulders and the adjacent threaded portion and proportioned to be engaged by the side bevel of the nose of the pipe when the nose of the pipe is in contact with the ring member to provide a seal against internal pressures that cannot be displaced by such internal pressures;
means defining end grooves in each of the end recess portions outside the threaded portions of the collar; and
a pair of end seals each disposed in a different one of the end grooves and engaging the adjacent received pipe in the region of the last scratch mark thereof when the nose of the pipe is in contact with the ring member to provide a seal against external pressures, whereby the collar is both adequately mechanically engaged and sealed to matingly receive pipes without the introduction of mechanical stress risers in the collar.

10. A coupling for uniting lengths of standard tubing or casing in long strings subjected to high axial loading and high internal or external pressures, or both, the tubing or casing having threaded regions of specified pitch and size terminating in a side bevel at the nose end and in a last scratch mark at a spaced apart region, the coupling comprising:
a collar having internally tapered threshold regions diverging outwardly from a central region and a pair of standard tubing or casing elements having nose ends and threaded regions for mating with the threaded regions of the collar;
means disposed in the central region of the collar for providing a pair of reference shoulders spaced apart by a selected distance relative to the size and type of tubing or casing and an acceptable range of dimensional and taper tolerances for the given size and type of tubing or casing, for defining adequate threaded bearing engagement regions between the tubing or casing and collar, despite tolerance variations in the standard tubing or casing when the nose ends of the pipes engage the respective reference shoulders;
interior seal means in the collar disposed adjacent each of the reference shoulders and being positioned and proportioned to be in engagement with the side bevels adjacent the nose ends of the respective tubings or casings and to be compressed into adjacent inital threads when the tubings or casings are fully inserted to engage the respective reference shoulders; and
exterior seal means disposed adjacent each end of the collar and being positioned and proportioned to be deformed by the opposing inserted tubing or casing in the last scratch mark region to provide a seal against external pressures, the exterior seal means being deformable outwardly in response to internal pressures in excess of a predetermined level, and returning to position to provide sealing against external pressures after venting.

11. The invention as set forth in claim 10 above, wherein said means for providing a pair of reference shoulders includes a central ring integral with the collar body and defining the reference shoulders, and wherein said interior seal means comprises a pair of seals, each disposed adjacent the juncture of a different one of the reference shoulders and the adjacent threaded taper of the collar.

12. The invention as set forth in claim 10 above, wherein the coupling has plastic coatings on the interior surfaces of the means for providing a pair of reference shoulders for the pipes.

13. A coupling for uniting lengths of standard tubing or casing in long strings subjected to high axial loading and high internal or external pressures, or both, the tubing or casing having threaded regions of specified pitch and size terminating in a side bevel at the nose end and in a last scratch mark at a spaced apart region, the coupling comprising:
   a collar having internally tapered threshold regions diverging outwardly from a central region and a pair of standard tubing or casing elements having nose ends and threaded regions for mating with the threaded regions of the colar, the collar being a modified A. P. I. collar, including a central seating region defined by a removed central crest;
   means comprising a central precision position ring within the central seating region, opposite faces of the position ring defining a pair of reference shoulders spaced apart by a selected distance relative to the size and type of tubing or casing and an acceptable range of dimensional and taper variations for the given size and type of tubing or casing, for defining adequate threaded bearing engagement regions between the tubing or casing and collar, despite tolerance variations in the standard tubing or casing when the nose end of a tubing or casing engages the respective reference shoulder;
   interior seal means comprising a central seal ring in the seating region of the collar and the central precision position ring being within the central seal ring, the central seal ring being positioned and proportioned to be in engagement with the side bevels adjacent the nose ends of the respective tubings or casings and to be compressed into adjacent initial threads when the tubings or casings are fully inserted to engage the respective reference shoulders; and
   exterior seal means disposed adjacent each end of the collar and being positioned and proportioned to be deformed by the opposing inserted tubing or casing in the last scratch region to provide a seal against external pressures, the external seal means being deformable outwardly in response to internal pressures in excess of a predetermined level, such as to provide a venting of internal pressures, and returning to position to provide sealing against external pressures after venting.

14. The invention as set forth in claim 13 above, wherein the interior circumference of the precision position ring lies flush with the interior circumference of the tubing or casing, and wherein the collar includes end recess portions receiving the exterior seal means and having inner diameters larger than the outer diameters of fully inserted tubing or casing such that the seal means can deform outwardly in response to internal pressures and thereafter return to position to provide sealing.

15. A coupling collar for engagement to the ends of standard A. P. I. round or buttress tubing or casing having threads of predetermined diameter and taper but subject to variations of thread diameter and taper, the threaded regions thereof terminating in a bevel at the nose end and the collar comprising:
   a collar including a modified A. P. I. collar body having an internal central region with an inner diameter at least as large as the outer diameter of the nose end of the inserted tubing or casing and oppositely tapering threaded regions extending from said central region and terminating in end recess portions that have inner diameters greater than the outer diameters of the inserted tubing or casing;
   an internal, separate, centrally disposed precision makeup ring mounted within said internal central region and having axially separated reference shoulders, the length of the ring between the shoulders being selectable within a predetermined range to control, in accordance with the radial stress to be encountered, the dimensional engagement of the threaded regions of the tubing or casings to be inserted and the interior circumference of the ring lying flush with the interior circumference of the tubing or casing;
   central seal means seated in the internal central region and providing seal surfaces adjacent each of the opposite reference shoulders, such that the threaded regions on the collar mate with the inserted threads on the tubing or casing with desired bearing engagement when the inserted tubing or casing engages the adjacent reference shoulder, while the seal surfaces of the central seal means engage in and seal against the bevel at the inserted nose end of the adjacent standard tubing or casing;
   said end recess portions defining end grooves in the collar; and
   end seal means disposed in each of the end grooves of the collar and engaging and sealing the tubing or casing when the tubing or casing is fully inserted to the reference shoulder.

16. The invention as set forth in claim 15 above, wherein the central seal means is a central seal ring of greater axial length than the precision makeup ring and the precision makeup ring has an outer diameter lying within the central seal ring and an inner diameter region lying substantially flush with the inner diameters of tubings or casings to be engaged into the collar.

17. The invention as set forth in claim 17 above, wherein said central seal means comprises a pair of internal seals disposed in the collar on opposite sides of the ring.

18. The invention as set forth in claim 15 above, wherein the ring includes ridged portions thereabout on the surfaces facing the pipe to be engaged into the collar.

19. The invention as set forth in claim 15 above, wherein the end grooves are disposed in each of the end recess portions of the collar, and the standard tubing or casing includes a last scratch mark at the end of the threaded region and the end seal rings are positioned to contact the tubing or casing at approximately the last scratch area thereof and deform into the tubing or casing threads thereat when the tubing or casing is fully inserted.

20. The invention as set forth in claim 19 above, wherein the end grooves have diverging sides and the end seal rings that are disposed in the end groove configurations mating with the end grooves whereby a high frictional contact area is provided to prevent rotation of the rings as tubing or casing is threaded in.

21. A coupling system for joining a pair of standard A. P. I. tubing or casing ends whose inserted ends have a threaded region with specified size and taper tolerances terminating at one limit in a nose end having a side bevel and terminating at the other limit in a last scratch mark, the coupling establishing structural integrity and high resistance to axial stress while providing both internal and external seals in a fashion to reduce the time expended for tubing or casing makeup and expand the range of pressure environments and load bearing applications for which given tubing or casing sections can be used without modification of the tubing or casing, comprising:

a collar member including interior threaded regions adjacent each end, the threaded portions tapering oppositely from the central region with specified angles and tolerances;

means in the central interior region of the collar member for defining axially separated metal reference shoulders facing each thread region, the distance of axial separation of the shoulders being selected to define an acceptable range of load bearing engagement between the threaded regions of the A. P. I. being used and the threaded region of the collar members tubing or casing when the nose of a tubing or casing is engaged against the reference shoulder;

interior seal means in the collar member adjacent the junction of each shoulder and the adjacent threaded region, the interior seal means being proportioned to engage and be deformed by the side bevel of the A. P. I. tubing or casing when inserted to provide mating contact when the nose of the tubing or casing end is engaged against the metal reference shoulder; and exterior seal means inside the collar member adjacent each end thereof and substantially opposite the last scratch mark region, the exterior seal means being proportioned to be deformed by the last scratch region of the inserted A. P. I. tubing or casing when the tubing or casing is engaged in the threaded region with its nose in contact with the reference shoulder and being deformably outwardly in response to internal pressure in excess of a predetermined level, such as to provide a venting of internal pressures, and returning to position to provide sealing against internal pressure after venting.

22. A coupling system for joining a pair of standard A. P. I. tubing or casing ends, the inserted ends of which have externally threaded regions with specified size and taper tolerances, each tubing or casing nose end having a predetermined side bevel and the threaded region terminating at the other end in a last scratch mark, the coupling system comprising:

a collar including interior threaded regions tapering oppositely from the central region of the collar member with specified angles and tolerances selected to receive the chosen tubing or casing, the collar further including end recess surfaces at each end having greater internal diameters than the facing exterior diameter of a fully inserted tubing or casing, and outer seal grooves adjacent each end and substantially opposite the last scratch mark of a fully inserted tubing or casing, the outer seal grooves diverging in the direction toward the central axis of the collar to provide frictional restraining surfaces for a mating seal ring, the collar also including means defining interior seal receiving surfaces adjacent each nose end of a fully inserted tubing or casing;

a metal central ring within the collar defining a pair of axially separated reference shoulders facing each threaded region, the axial positions of the shoulders defining limit positions for tubing or casing threaded into the collar at which there is acceptable load bearing engagement between the interior threaded region of the collar and the mating exterior threaded region of the tubing or casing;

interior seal means in the interior seal receiving surfaces of the collar, the interior seal means including edges positioned and proportioned to mate with the bevels of the nose ends of fully inserted tubings or casings, and to be compressed into adjacent initial threads when the tubings or casings are fully inserted; and a pair of seal rings, each disposed within a different one of the outer seal grooves and having a mating surface in frictional engagement therewith, the seal rings each being positioned and proportioned to be deformed by the opposing inserted tubing or casing in the last scratch mark region to provide a seal against external pressures while being in communication with the space between the collar and the tubing or casing at the end recess surface to deform outwardly in response to internal pressures in excess of a predetermined level so as to vent internal pressures, while returning to position after venting to provide sealing against external pressures.

* * * * *

UNITED STATES PATENT AND TRADEMARK OFFICE
CERTIFICATE OF CORRECTION

PATENT NO. : 4,706,997
DATED : November 17, 1987
INVENTOR(S) : Kenneth J. Carstensen It is certified that error appears in the above-identified patent and that said Letters Patent are hereby corrected as shown below:

Column 6, line 43, after "by" and before "Phillips", strike "the". Column 19, line 20, after "A.P.I." insert --tubing or casing--.

Signed and Sealed this

Twenty-fifth Day of October, 1988

Attest:

DONALD J. QUIGG

*Attesting Officer*  *Commissioner of Patents and Trademarks*